United States Patent
Hoff (10) Patent No.: US 9,440,656 B2
(45) Date of Patent: Sep. 13, 2016

(54) TORQUE CONTROL FOR DOG CLUTCH DIFFERENTIAL ENGAGEMENT

(71) Applicant: Caterpillar Inc., Peoria, IL (US)

(72) Inventor: Brian Douglas Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 103 days.

(21) Appl. No.: 14/559,394

(22) Filed: Dec. 3, 2014

(65) Prior Publication Data
US 2016/0159356 A1 Jun. 9, 2016

(51) Int. Cl.
G06F 7/00 (2006.01)
G06F 17/00 (2006.01)
(Continued)

(52) U.S. Cl.
CPC .......... *B60W 30/188* (2013.01); *B60W 10/101* (2013.01); *B60W 10/14* (2013.01); *B60W 30/18172* (2013.01); *B60W 2422/70* (2013.01); *B60W 2510/104* (2013.01); *B60W 2510/105* (2013.01); *B60W 2510/1005* (2013.01); *B60W 2520/10* (2013.01); *B60W 2520/26* (2013.01); *B60W 2710/105* (2013.01); *B60W 2710/1038* (2013.01); *B60W 2710/12* (2013.01)

(58) Field of Classification Search
USPC ......... 701/48, 54; 74/640, 661; 477/35, 107; 475/198–199
See application file for complete search history.

(56) References Cited

U.S. PATENT DOCUMENTS 3,612,202 A * 10/1971 Moon, Jr. ............... F16H 47/02
                                                    180/14.3
5,011,458 A *  4/1991 Kumm ..................... F16H 9/10
                                                    474/49
(Continued)

FOREIGN PATENT DOCUMENTS

GB    0423517.2    * 10/2004  ............ B60F 3/0007
JP    2000-266847  *  9/2000  ............. F16H 57/04
(Continued)

OTHER PUBLICATIONS

Nonlinear control of a continuously variable transmission (CVT) for hybrid vehicle powertrains; Setlur, P.; Wagner, J.R.; Dawson, D.M.; Samuels, B.; American Control Conference, 2001. Proceedings of the 2001; Year: 2001, vol. 2; pp. 1304-1309 vol. 2, DOI: 10.1109/ACC.2001.945903.*

(Continued)

*Primary Examiner* — Cuong H Nguyen
(74) *Attorney, Agent, or Firm* — Miller, Matthias & Hull LLP (57) ABSTRACT

A system and method for providing engagement of a dog clutch differential on a vehicle are disclosed. The system may comprise a power source, a dog clutch differential, a CVT and a controller. The dog clutch differential may have first and second members and may distribute torque between first and second output shafts. The second member may be moveable between a disengaged and an engaged position. When the second member is in the engaged position, the first and second output shafts may rotate together. The CVT may be configured to receive power from the power source and to provide output torque to the dog clutch differential. The CVT may receive a torque or speed or ratio command that is independent of engine speed. The controller may, in response to an activation trigger, move the second member to the engaged position when the output torque from the CVT is about zero.

20 Claims, 5 Drawing Sheets

(51) Int. Cl.
  *G06F 19/00*     (2011.01)
  *B60W 30/188*    (2012.01)
  *B60W 10/14*     (2012.01)
  *B60W 10/101*    (2012.01)
  *B60W 30/18*     (2012.01)

(56) References Cited

U.S. PATENT DOCUMENTS

| | | | |
|---|---|---|---|
| 6,174,255 B1 | 1/2001 | Porter et al. | |
| 6,820,712 B2 | 11/2004 | Nakamura | |
| 6,850,830 B2 | 2/2005 | Nishida et al. | |
| 7,195,579 B2 * | 3/2007 | Claussen | B60K 23/08 477/107 |
| 7,276,015 B2 | 10/2007 | Stervik | |
| 7,666,116 B2 | 2/2010 | Scheer et al. | |
| 7,770,681 B2 | 8/2010 | Marathe et al. | |
| 8,626,410 B2 * | 1/2014 | McCann | F16H 48/20 477/35 |
| 2007/0015620 A1 * | 1/2007 | Inoue | F16H 57/04 475/210 |
| 2009/0069966 A1 * | 3/2009 | Tabata | B60K 6/445 701/22 |
| 2009/0075774 A1 * | 3/2009 | Tabata | B60K 6/445 475/150 |
| 2012/0150404 A1 | 6/2012 | Kubozono et al. | |
| 2014/0262672 A1 * | 9/2014 | Raszkowski | F16D 11/14 192/69.8 |
| 2015/0298704 A1 * | 10/2015 | Itagaki | B60W 30/20 701/22 |
| 2015/0354682 A1 * | 12/2015 | Yamamoto | F16H 37/0846 475/198 |
| 2016/0076646 A1 * | 3/2016 | Raszkowski | F16D 11/14 476/38 |
| 2016/0096429 A1 * | 4/2016 | Imafuku | B60K 17/344 180/233 |
| 2016/0097430 A1 * | 4/2016 | Imafuku | F16D 25/0638 192/18 B |

FOREIGN PATENT DOCUMENTS

| | | | | |
|---|---|---|---|---|
| JP | 2001-62478 | * | 2/2001 | F16H 57/04 |
| JP | 2003-382607 | * | 11/2003 | B60K 6/387 |
| WO | 9301065 A1 | | 1/1993 | |

OTHER PUBLICATIONS

Nonlinear stabilization of slip in a continuously variable transmission; T. W. G. L. Klaassen; B. Bonsen; K. G. O. van de Meerakker; M. Steinbuch; P. A. Veenhuizen; F. E. Veldpaus; Control Applications, 2004. Proceedings of the 2004 IEEE International; onference on; Year: 2004, vol. 1; pp. 338-343 vol. 1, DOI: 10.1109/CCA.2004.1387234.*

Novel Electrical Continuously Variable Transmission System and its Numerical Model; Yulong Liu; S. L. Ho; W. N. Fu; IEEE Transactions on Magnetics; Year: 2014, vol. 50, Issue: 2; Article #: 7018704, DOI: 10.1109/TMAG.2013.2286211.*

A study on mode switching smoothly on hybrid electric vehicle based on CVT; Jun Zhang; Wei Huang; Yunshan Zhou; Chenglong Cao; Remote Sensing, Environment and Transportation Engineering (RSETE), 2011 International Conference on; Year: 2011 pp. 972-975, DOI: 10.1109/RSETE.2011.5964441.*

* cited by examiner

TORQUE CONTROL FOR DOG CLUTCH DIFFERENTIAL ENGAGEMENT

TECHNICAL FIELD

The present disclosure generally relates to a system for providing smooth engagement of a dog clutch differential used on a vehicle.

BACKGROUND

Differentials may be used on vehicles to distribute torque between front and rear axles or between left and right axle shafts on a vehicle. However, under some driving conditions, for example during conditions likely to cause wheel slip or during periods of wheel slip, it may be advantageous to lock the rear and front axles together, or to lock the right axle shaft to the left axle shaft (of either the rear or front wheels). Differentials that utilize dog clutches are known in the art to provide such locking arrangements.

Ideally, when using a dog clutch differential to lock shafts, an operator will engage the differential prior to slip or bring the vehicle to a stop prior to engaging the dog clutch. In practice this may not always happen, especially if the wheels of the vehicle begin to slip prior to engagement of the dog clutch differential. Engagement of the dog clutch differential, when there is excessive motion between the two members (such as during tire slip), may cause ratcheting or grinding of the teeth of the dog clutch and may ultimately result in damage to the dog clutch differential or other components.

U.S. Pat. No. 7,195,579, issued Mar. 27, 2007, is an example of prior art in the actuation of dog clutch differentials in which a microprocessor momentarily communicates a message to an engine electronic controller to brake engine torque when the sliding clutch and helical gear of a dog clutch are placed in engagement mode or disengagement mode. While beneficial for conventional transmissions in which a torque converter is coupled to a mechanical power shift, this arrangement may not reduce torque output for a Continuously Variable Transmission (CVT) because CVTs typically receive a speed or torque command that is independent of engine speed or torque. Thus, simply reducing engine speed or torque on a CVT application could cause an undesired engine lug or stall rather than the desired reduction in CVT output torque. A better method and system is needed that can be used on CVTs that are controlled independently of engine speed.

SUMMARY OF THE DISCLOSURE

In accordance with one aspect of the disclosure, a system for providing smooth engagement of a dog clutch differential disposed on a vehicle is disclosed. The system may comprise a power source configured to generate power for the vehicle, a dog clutch differential, a CVT operably coupled to the power source and to the dog clutch differential, and a controller. The dog clutch differential may have first and second members and may be operably connected to and configured to distribute torque between a first output shaft and a second output shaft. The second member may be moveable between a disengaged position and an engaged position. Wherein, when the second member is in the engaged position, the first and second output shafts may rotate together. The CVT may be configured to receive power from the power source and to provide output torque to the dog clutch differential. The CVT may be configured to receive a torque or speed or ratio command that is independent of engine speed. The controller may be configured to, in response to an activation trigger, move the second member to the engaged position when the output torque from the CVT is about zero.

In accordance with another aspect of the disclosure, a method for providing smooth engagement of a dog clutch differential disposed on vehicle is disclosed. The vehicle may include a power source configured to generate power for the vehicle, and a CVT operably coupled to the power source and to the dog clutch differential. The CVT may be configured to receive power from the power source and to provide output torque to the dog clutch differential. The dog clutch differential may include a first member and a second member. The second member may be moveable between a disengaged position and an engaged position in which the first and second members rotate together. The method may comprise receiving, by a controller, an activation trigger and in response to the activation trigger, moving the second member to the engaged position when the output torque from the CVT is about zero.

In accordance with a further aspect of the disclosure a system for providing smooth engagement of a dog clutch differential disposed on vehicle is disclosed. The system may comprise a power source configured to generate power, a dog clutch differential, a CVT operably coupled to the power source and to the dog clutch differential, a front output shaft operably coupled to the dog clutch differential and to a front traction member, a rear output shaft operably coupled to the dog clutch differential and to a rear traction member, and a controller.

The dog clutch differential may be operably connected to and configured to distribute torque between the front output shaft and the rear output shaft. The dog clutch differential may include a first member and a second member. The second member may be moveable between a disengaged position and an engaged position. The CVT may be configured to receive power from the power source and to provide output torque to the dog clutch differential. The controller may be configured to, in response to an activation trigger, reduce the CVT output torque command to about zero and then move the second member to the engaged position, wherein when the second member is in the engaged position, the front and rear output shafts rotate together. Once engaged the controller may then increase the CVT output torque command back to the operator requested level.

DETAILED DESCRIPTION

Figure 1:
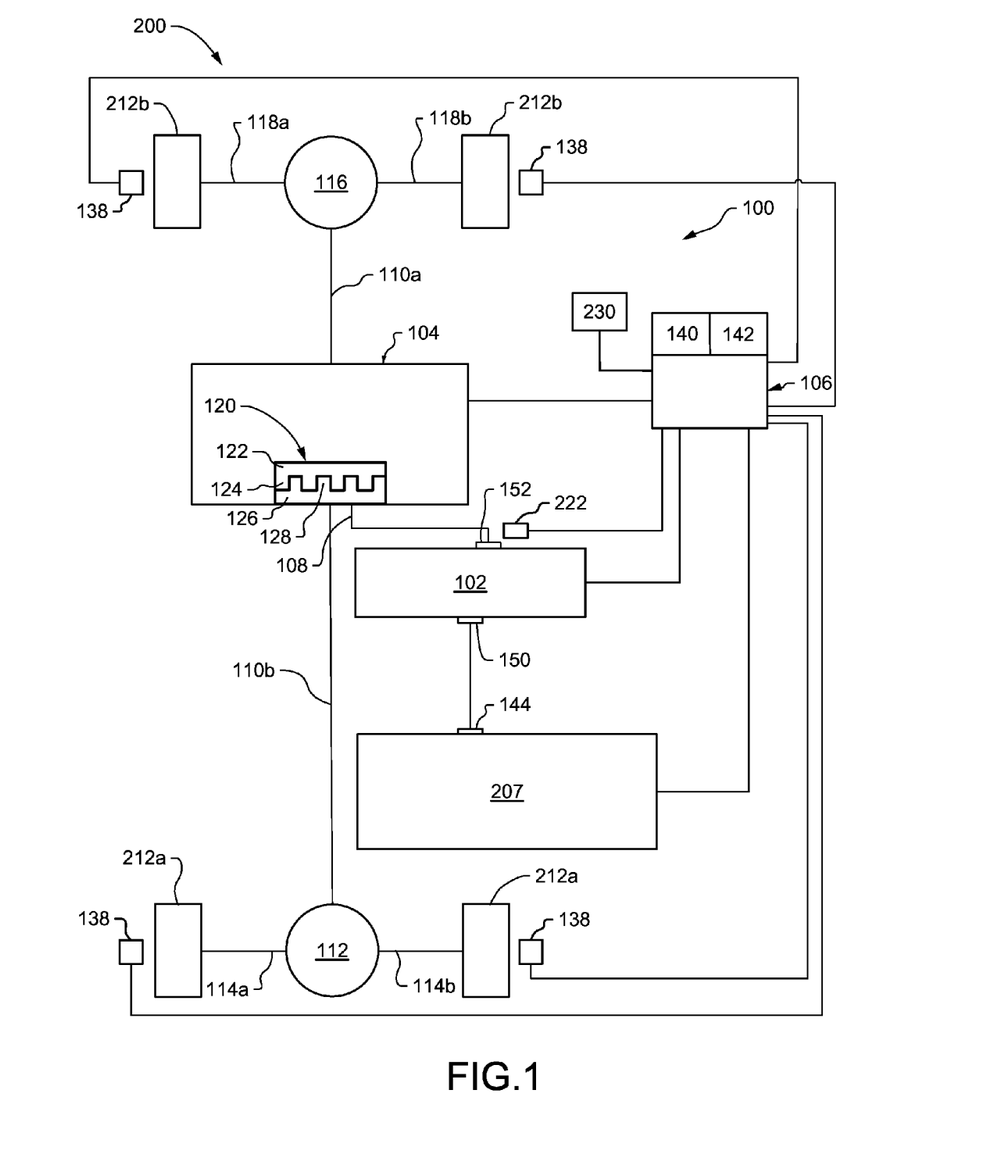
FIG. 1 is a schematic of an exemplary system in accordance with the teachings of this disclosure.

Referring now to the drawings, and with specific reference to FIG. 1, there is shown a schematic of an exemplary system in accordance with the present disclosure and generally referred to by reference numeral 100. Such a system 100 could apply to intra or inter axle lock mechanisms.

Figure 2:
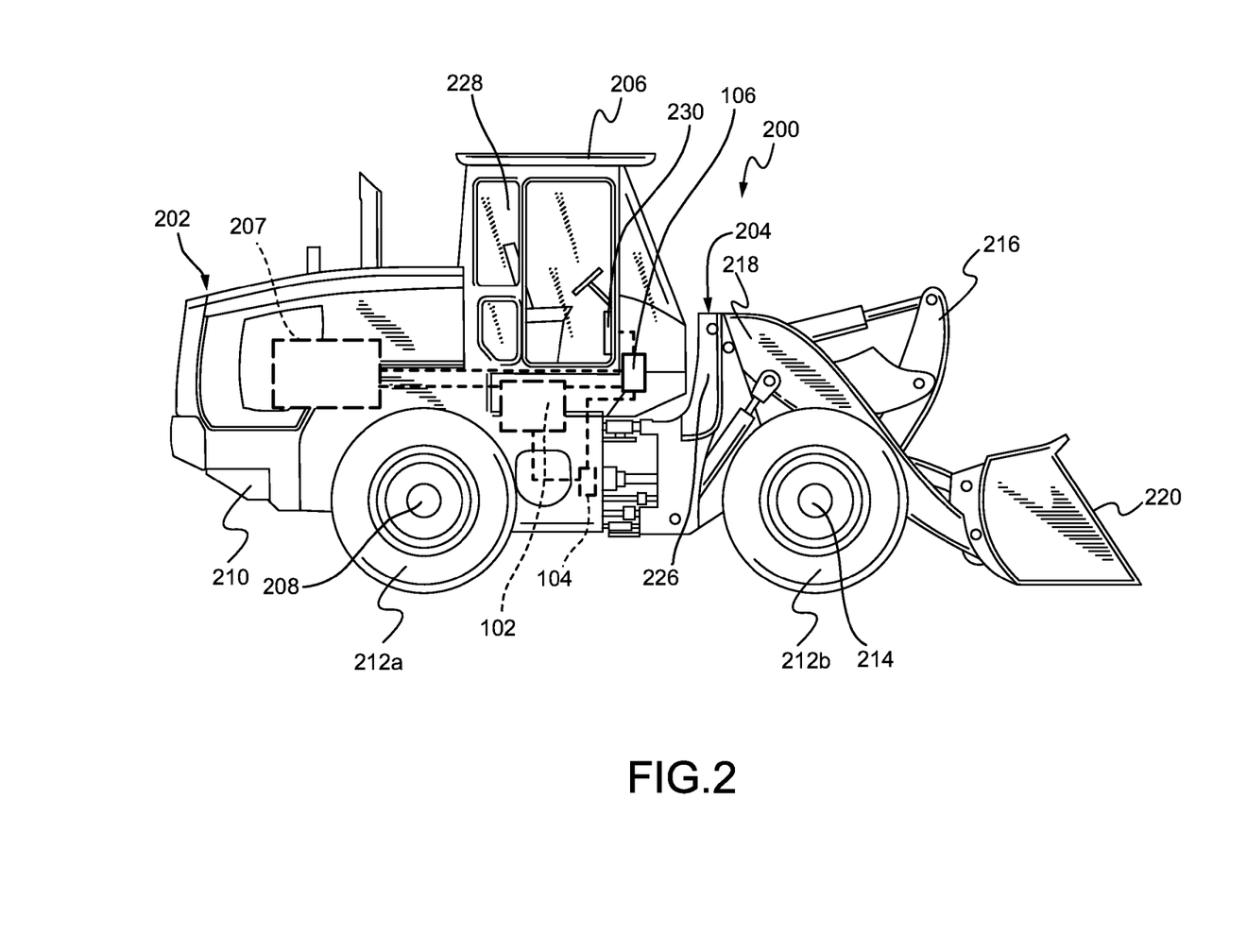
FIG. 2 is a perspective view of an exemplary vehicle that includes the system of FIG. 1.

FIG. 2 illustrates one example of a vehicle 200 that incorporates the features of the present disclosure. The vehicle 200 includes a rear portion 202 and a front portion 204. The rear portion 202 may include a cab assembly 206, a power source 207, a rear axle assembly 208, and transmission 102 mounted to a rear frame 210. Rear traction members 212a may be mounted to the rear axle assembly 208. The front portion 204 may include a frame assembly 226 and a front axle assembly 214. A tilt lever assembly 216 and a lift arm assembly 218 may be mounted on the frame assembly 226. An implement 220 may be attached to the tilt lever assembly 216 and to the lift arm assembly 218. The front traction members 212b may be mounted on the front axle assembly 214, which may be mounted on the frame assembly 226.

The cab assembly 206 may include an operator station 228 that may include one or more operator input devices 230 that may receive input from a machine operator indicative of activation of engagement of a dog clutch differential 104. The rear and front traction members 212a, 212b may embody wheels located on each side of vehicle 200 (only one side shown). Alternatively, rear and front traction members 212a, 212b may include tracks, belts or other known traction devices. It is contemplated that various embodiments of a vehicle 200 may have different combinations of the rear and front fraction members 212a, 212b being driven and/or steered.

While the following detailed description and drawings are made with reference to use on an exemplary vehicle 200 that is a wheel loader, the teachings of this disclosure may be employed on other vehicles, for example, a bus, a highway haul truck, or other types of mobile machines known in the art.

Turning now to FIG. 1, the system 100 may comprise the power source 207, the transmission 102, the dog clutch differential 104, and a controller 106. The system 100 may further include wheel sensors 138 that measure the occurrence of wheel slip on traction members 212, sensor(s) 222 that measure output torque provided by the transmission 102, and an operator input device 230.

The power source 207 is configured to generate power for the vehicle 200 and is operatively connected to the transmission 102. The power source 207 may include an internal combustion engine such as, for example, a heavy fuel engine, a diesel engine, a gasoline engine, a gaseous fuel engine, or the like, and may be of any size, with any number of cylinders, and in any configuration ("V," in-line, radial, etc.). It is contemplated that the power source 207 may alternatively include another source of power such as a battery, a fuel cell or any other appropriate source of power known in the art.

The transmission 102 is operably connected to receive power output from the power source 207 via power source output 144 and to transmit torque to the traction members 212a, 212b. Power source output 144 may be a drive shaft or the like. The transmission 102 is configured to receive a torque, speed, or ratio command that is independent of engine speed. The transmission 102 may be a CVT. CVTs typically are configured to receive a torque, speed, or ratio command that is independent of engine speed. For example, in one exemplary embodiment illustrated schematically in FIG. 5, the CVT 102 may be a split-path, hydromechanical CVT. The CVT 102 is operably connected to receive power output from the power source 207 (via power source output 142) through a CVT input member 150. The rotational input from CVT input member 150 is then proportionally split into two parallel paths before being recombined at a CVT output member 152. The paths may include a mechanical power-transfer path 160 and a hydrostatic power-transfer path 170 disposed inside the CVT 102. To physically split the rotational input, a path splitter 154 coupled to a shaft of the CVT input member 150 may include a series of parallel, intermeshing gears that may duplicate and offset the rotational axis of the rotary input to align with either or both of the mechanical power-transfer path 160 and the hydrostatic power-transfer path 170.

Figure 5:
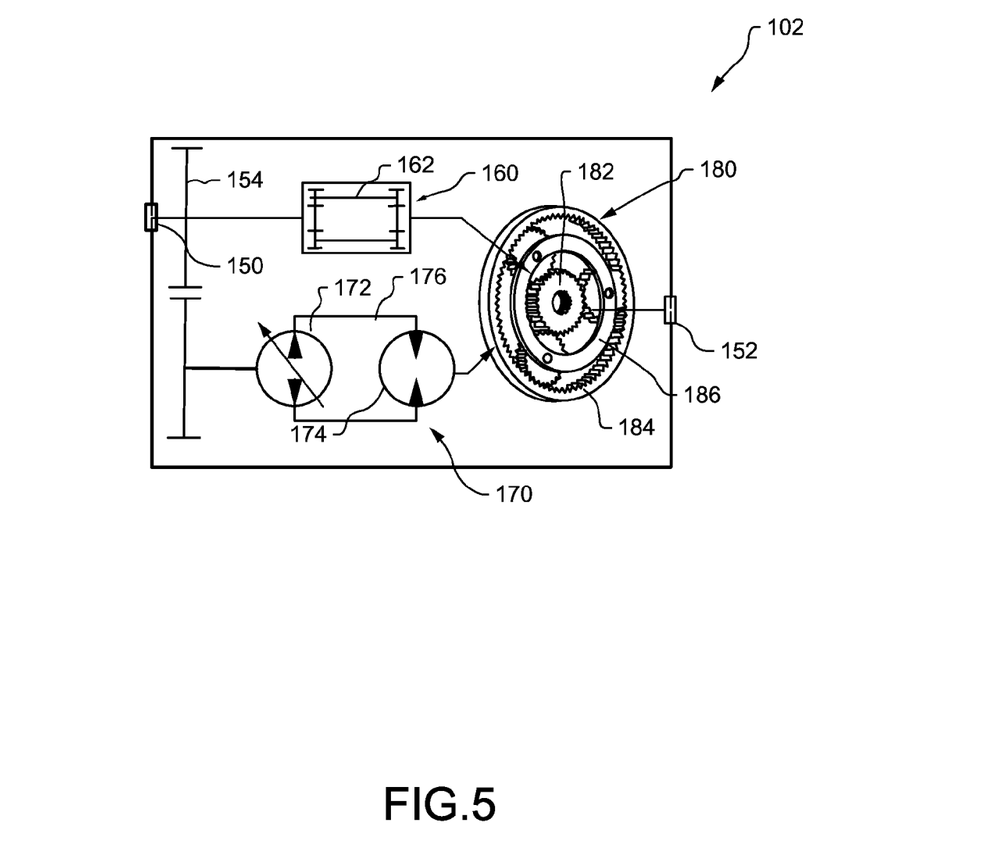
FIG. 5 is an exemplary CVT.

The mechanical power-transfer path 160 may transfer the rotational power input from the CVT input member 150 to the CVT output member 152 by mechanical, dynamic techniques. For example, the mechanical power-transfer path 160 may embody a multispeed, bidirectional, mechanical transmission with various forward gears, reverse gears and/or clutches. The gears and/or clutches may be arranged in an adjustable and selectively engageable gear train 162 so that predetermined gear combinations may be engaged to produce a discrete output gear ratio. In this manner, the mechanical power-transfer path may function similarly to the traditional gear-based transmissions.

The hydrostatic power-transfer path 170 may transfer the rotational power output from the CVT input member 150 to the CVT output member 152 using fluid mechanics and hydraulics concepts. For example, the hydrostatic power-transfer path 170 may include a hydraulic pump 172 and a hydraulic motor 174 interconnected by a fluid transfer line 176 such as a flexible hydraulic hose that may channel hydraulic fluid. The hydraulic pump 172, which may be a variable displacement pump, swash plate, or the like, may be operatively coupled to the CVT input member 150 and may convert the rotary power input to hydraulic pressure by pressurizing the hydraulic fluid in the fluid transfer line 176. The fluid transfer line directs the pressurized hydraulic fluid to the hydraulic motor 174 to rotate an associated impeller or the like and reconvert the hydraulic pressure to a rotational output. A "gear ratio" or "effective gear ratio" of hydrostatic power-transfer path 170 may be altered by, for example, varying the displacement of the hydraulic pump 172 or changing the resistance of the fluid transfer line 176. Hydraulic displacement and/or resistance may be varied continuously within the operational limits of the CVT 102 to provide an infinite number of effective gear ratios.

The outputs of the mechanical power-transfer path 160 and a hydrostatic power-transfer path 170 may be recombined using one or more gear assemblies operating in conjunction with the CVT output member 152. For example, the gear assemblies may include a planetary gear 180 including an inner sun gear 182, an outer ring gear 184, and an intermediary carrier 186 operatively engaged with each other. As will appreciated by those of skill in the art, the interrelationship and the relative rotation of the various gears in a planetary gear may be adjusted to produce a variety of different outputs including reversible outputs. For example, the speed at which ring gear 184 rotates relative to a ground, and the speed at which carrier 186 rotates relative to ring gear 184, may determine a rotational speed of sun gear 182. Accordingly, any combined gear ratio may be achieved by varying the discrete gear ratio of the mechanical power-transfer path 160, the variable gear ratio of the hydrostatic power-transfer path 170, and recombining them at different selected relations in the planetary gear 180, thus changing the output torque and speed characteristics of the CVT 102.

In other embodiments, the CVT 102 may be a purely mechanical CVT using a series of selectable, interrelated gear trains such as the gear train 162 in FIG. 5. The purely mechanical CVT 102 may also be realized as a variable diameter friction pulley system including two or more, parallel, inverted cone-like pulleys interconnected by a belt. An actuator may axially displace the belt with respect to the parallel pulleys to align at different diameters thereby producing variable torque and speed outputs. In other embodiments, the CVT 102 may be a purely hydrostatic CVT 102 similar to the hydrostatic power-transfer path 170 in FIG. 5. Furthermore, the CVT 102 may be an electrical-magnetic CVT including a generator-motor combination. The rotational input may drive the generator to produce electricity that drives the motor to reproduce the rotational output. To continuously vary the torque-to-speed ratio, the electrical resistance between the generator and motor may be adjusted in increasingly small increments. In other embodiments, any other suitable type of CVT may be used.

To selectively couple and de-couple the CVT 102 to/from the input shaft 108 (connected to the dog clutch differential 104), the CVT output member 152 may be a clutch. Such output member 152 (clutch) may include two or more selectively engageable components that, when engaged, may transmit rotational power or force. However, when disengaged, the output member 152 (clutch) is no longer able to transfer or transmit power. If the CVT output member 152 is a disengaged clutch, transfer of rotary power to the dog clutch differential 104 is effectively prevented even if the CVT 102 is operating under input from the power source 106. In this embodiment, any suitable type of clutch for the CVT output member 152 may be used including mechanical friction clutches, fluid clutches, electrical or electronic clutches and the like.

The transmission 102 may be operatively connected to the traction members 212 via one or more differentials. For example, in the exemplary embodiment schematically illustrated in FIG. 1, the transmission 102 is operatively connected to a dog clutch differential 104 by an input shaft 108. The transmission 102 is configured to provide output torque to the dog clutch differential 104. The dog clutch differential 104, in the exemplary embodiment, is operably connected to and may be configured to distribute such output torque received from the transmission 102 between a front output shaft 110*a* (a first output shaft) and a rear output shaft 110*b* (a second output shaft).

The rear output shaft 110*b* may be operably connected to a rear wheel differential 112. The rear wheel differential 112 may be configured to distribute torque, received from the rear output shaft 110*b*, between left and right rear axle output shafts 114*a*, 114*b* and their respective traction members 212*a*.

The front output shaft 110*a* may be operably connected to a front wheel differential 116. The front wheel differential 116 may be configured to distribute torque, received from the front output shaft 110*a*, between left and right front axle output shafts 118*a*, 118*b* and their respective fraction members 212*b*.

The dog clutch differential 104 includes a dog clutch 120. As is known in the art, the dog clutch 120 includes a first member 122 having a plurality of first member teeth 124 and a second member 126 having a plurality of second member teeth 128. The second member 126 may be operably connected to the rear output shaft 110*b* and may rotate with the rear output shaft 110*b*. The first member 122 may be operably connected to the front output shaft 110*a* and may rotate with the front output shaft 110*a*.

Figure 3A:
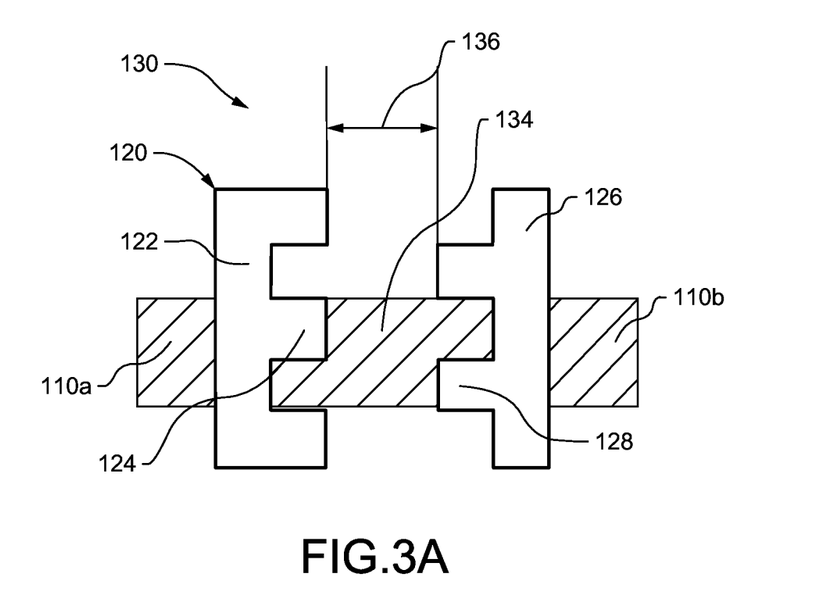
FIG. 3A is a perspective view of a portion of an exemplary dog clutch of a dog clutch differential in the disengaged position.
Figure 3B:
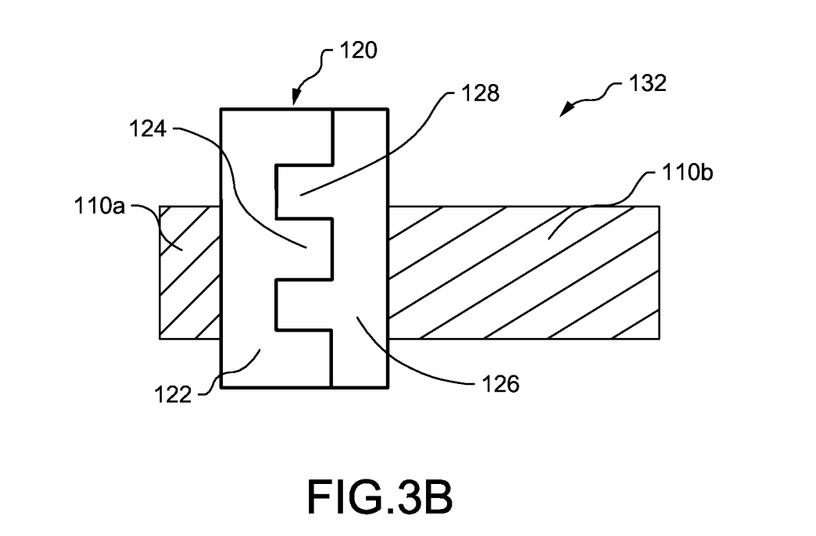
FIG. 3B is a perspective view of a portion of an exemplary dog clutch of a dog clutch differential in the engaged position.

One of the first and second members 122, 126 is moveable between a disengaged position 130 and an engaged position 132 (see FIGS. 3A-B). FIG. 3A illustrates an exemplary dog clutch 120 with the second member 126 in an exemplary disengaged position 130 and FIG. 3B illustrates the dog clutch 120 with the second member 126 in an exemplary engaged position 132 in which the first and second member teeth 124, 128 are meshed together. The other components of the dog clutch differential 104 have been removed in FIGS. 3A-B for clarity.

In the exemplary embodiment illustrated in FIGS. 3A-B, the second member 126 may be moveable between a disengaged position 130 (FIG. 3A) and an engaged position 132 (FIG. 3B). For example, the second member 126 may be slidable on a shaft portion 134, or the like, between the disengaged position 130 (FIG. 3A) in which the second member teeth 128 are separated from the first member teeth 124 of the first member 122 by a gap 136, to an engaged position 132 (FIG. 3B) in which the first and second member teeth 124, 128 of the respective first and second members 122, 126 are meshed together such that the front and rear output shafts 110*a*, 110*b* rotate together. In one embodiment, the first and second members 122, 126 may be locked together in the meshing relationship, as is known in the art, when the second member 126 is in the engaged position 132. When in the second member 126 is in the engaged position 132 and the first and second members 122, 126 are locked together, the first and second members 122, 126 are substantially stationary in relation to each other, and the front and rear output shafts 110*a*, 110*b* rotate together.

The controller 106 may include a processor 140 and a memory component 142. The controller 106 may be in operable communication with the power source 207, the transmission 102, the dog clutch differential 104, the operator input device 230, wheel sensors 138 that measure wheel slip, and sensor(s) 222 that measure output torque from the transmission 102. The processor 140 may be a microprocessor or other processor as known in the art. The processor 140 may execute instructions and generate control signals for, for example, moving the second member 126 of the dog clutch differential 104 to the disengaged position 130, for reducing output torque received by the dog clutch differential 104 from the transmission 102, for moving the second member 126 of the dog clutch differential 104 to the engaged position 132, and for increasing output torque received by the dog clutch differential 104 from the transmission 102. Such instructions that are capable of being executed by a computer may be read into or embodied on a computer readable medium, such as the memory component 142 or provided external to the processor 140. In alternative embodiments, hard wired circuitry may be used in place of, or in combination with, software instructions to implement a control method.

The term "computer readable medium" as used herein refers to any non-transitory medium or combination of media that participates in providing instructions to the processor 140 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 140 can read.

The controller 106 is not limited to one processor 140 and memory component 142. The controller 106 may be several processors 140 and memory components 142.

In one embodiment, the controller 106 may receive an activation trigger from an operator input device 230 such as a button, lever, or the like, and process the received activation trigger to activate engagement of the dog clutch differential 104 for the front and rear output shafts 110*a*, 110*b* (moving the second member 126 of the dog clutch differential 104 to the engaged position 132 such that the second member teeth 128 mesh with the first member teeth 124 and the output shafts 110 rotate together).

In some embodiments, the activation trigger may be based on data received from wheel sensors 138 that measure wheel slip of traction members 212. The controller 106, in some embodiments, may process such data and automatically (without waiting for receipt of an activation trigger from an operator input device 230) activate engagement of the dog clutch differential 104 for the front and rear output shafts 110*a*, 110*b* (move the second member 126 of the dog clutch differential 104 to the engaged position 132 such that the second member teeth 128 mesh with the first member teeth 124 and the output shafts 110 rotate together).

The controller 106 may also be configured to retrieve from the memory 142 data or information to process the received activation trigger and or to generate control signals to activate engagement of the dog clutch differential 104, to reduce transmission output torque, and to increase transmission output torque to an operator requested value after the second member 126 has been moved to the engaged position 132 and the second member teeth 128 are meshed with the first member teeth 124.

Also disclosed is a method for providing smooth engagement of the dog clutch differential 104 disposed on the vehicle 200. In an embodiment, the method may comprise receiving (by the controller 106) an activation trigger. The method may further comprise moving, in response to the activation trigger, the second member 126 to the engaged position 132 when the output torque from the CVT 102 is about zero, and increasing the output torque from the CVT to an operator requested value after the second member 126 is moved to the engaged position 132.

INDUSTRIAL APPLICABILITY

In general, the present disclosure may find applicability in vehicles 200 with CVTs 102 that are being used in conditions in which wheel slip may occur and engagement of a dog clutch differential 104 is desired or beneficial. The present disclosure avoids undesired engine lug or stall that can occur with CVTs 102 when engine speed or engine torque on a CVT application is reduced in an attempt to reduce CVT output torque. Such undesired engine lug or stall may occur because, unlike conventional transmissions, CVTs typically receive a speed or torque command that is independent of engine speed or torque.

Use of this application allows the dog clutch differential 104 to be smoothly engaged without damage to the dog clutch differential 104.

Figure 4:
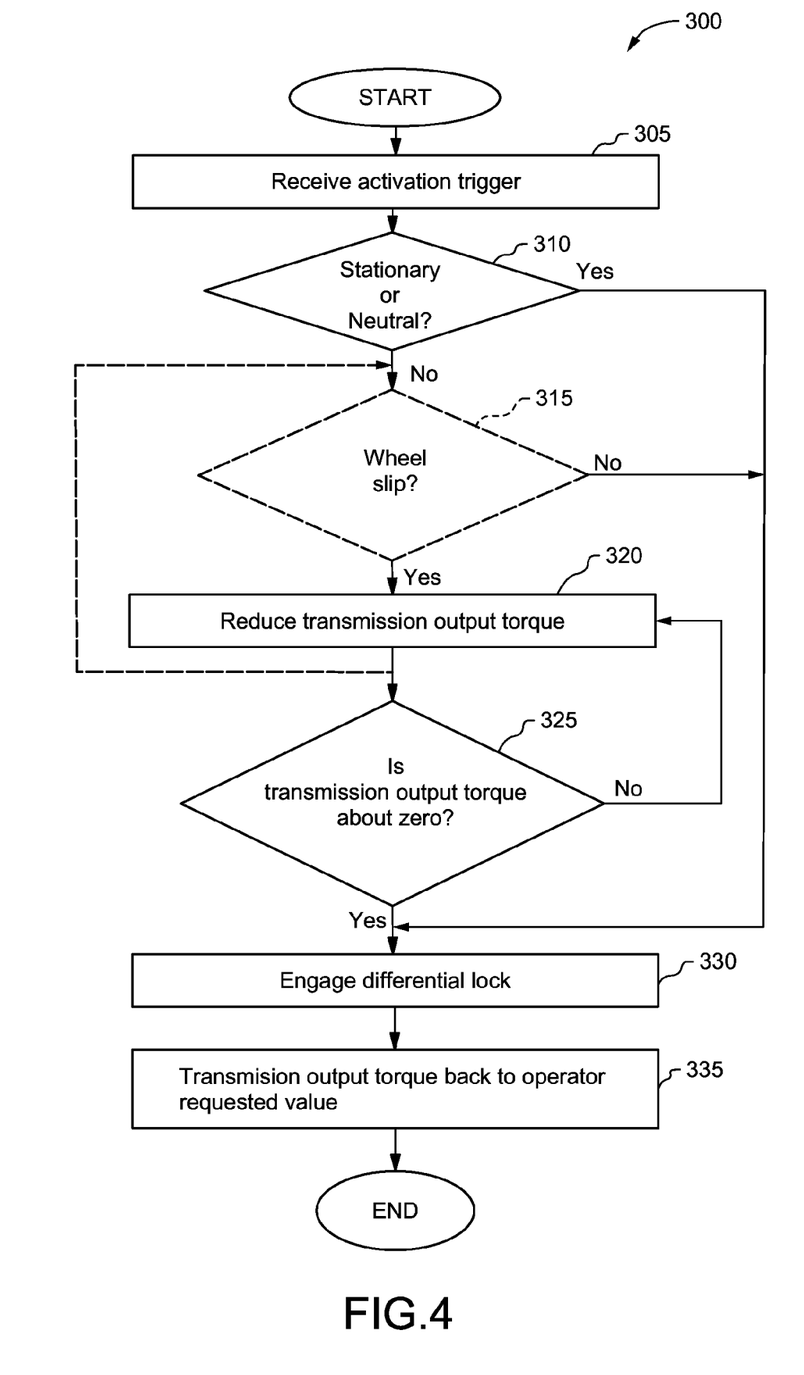
FIG. 4 is an exemplary method for providing smooth engagement of a dog clutch differential.

Referring now to FIG. 4, an exemplary method 300 is illustrated showing sample blocks which may be followed in a method for providing smooth engagement of a dog clutch differential 104 disposed on a vehicle 200. The method 300 may be practiced with more or less than the number of blocks shown.

In block 305 the controller 106 receives an activation trigger. The activation trigger may be generated in response to operator input, such as when the operator of the vehicle 200 activates an operator input device 230 such as a button, lever, or the like, to activate engagement of the dog clutch differential 104 for the front and rear output shafts 110*a*, 110*b* (for example, move the second member 126 of the dog clutch differential 104 to the engaged position 132 such that the second member teeth 128 mesh with the first member teeth 124 and the front and rear output shafts 110*a*, 110*b* rotate together).

In some embodiments, the activation trigger may be based on data received by the controller 106 from wheel sensors 138 that measure wheel slip occurring at one or more of the traction members 212. The controller 106, in some embodiments, may, in response to the activation trigger, process such data and automatically activate engagement of the dog clutch differential 104 for the front and rear output shafts 110*a*, 110*b* (for example, move the second member 126 of the dog clutch differential 104 to the engaged position 132 such that the second member teeth 128 mesh with the first member teeth 124 and the front and rear output shafts 110*a*, 110*b* rotate together). In some embodiments, such automatic response by the controller 106 may occur when the amount of measured wheel slip exceeds a predetermined threshold.

In block 310, the controller 106 determines whether the vehicle 200 is stationary or whether the CVT 102 is in neutral. If the controller 106 determines that the vehicle 200 is stationary or the CVT 102 is in neutral, the process will proceed to block 330 and the controller 106 will cause the second member 126 of the dog clutch differential 104 to move to the engaged position 132. However, if the controller 106 determines that the vehicle 200 is moving or the CVT 102 is in gear, the process, in some embodiments, may proceed to block 315. In other embodiments, the process may instead proceed to block 320.

In block 315, the controller 106 determines whether traction members 212 of the vehicle 200 are experiencing wheel slip. If the controller 106 determines that traction members 212 of the vehicle 200 are experiencing wheel slip, the process will proceed to block 320. If the controller 106 determines that traction members 212 of the vehicle 200 are not experiencing wheel slip, the process proceeds to block 330.

In block 320, the controller 106 causes the output torque from the CVT 102 to be reduced to about zero. Once the output torque from the CVT 102 is about zero, the process in one embodiment proceeds to block 325. In other embodiments, the process may loop back to block 315.

In block 325, the output torque from the CVT 102 is determined by the controller 106 (if the CVT output speed is not about zero). In one embodiment, the controller 106 may determine the output torque based on data received from sensors 222 disposed on the vehicle 200.

The controller 106 then determines whether the output torque from the CVT 102 is about zero. If the output torque from the CVT 102 is determined to be about zero, the process proceeds to block 330 where the controller 106 causes the second member 126 of the dog clutch differential 104 to move to the engaged position 132. If the output torque from the CVT 102 is determined to be greater than or less than about zero, the process proceeds to block 320.

In an alternative embodiment, block 325 may be modified to determine whether the absolute value of the output torque from the CVT 102 is greater than about zero but less than a "damaging torque threshold" for the particular powertrain arrangement. A damaging torque threshold for a particular powertrain arrangement is the minimum output torque from the CVT 102 at which damage to the dog clutch differential 104 occurs during engagement of the first and second members 124, 126. If the output torque from the CVT 102 is determined to be greater than or equal to the damaging torque threshold, the process proceeds to block 320. Otherwise the process proceeds to block 330.

In block 330, the controller 106 causes the second member 126 of the dog clutch differential 104 to move to the engaged position 132 such that the second member teeth 128 mesh with the first member teeth 124 and the front and rear output shafts 110*a*, 110*b* rotate together. In some embodiments, activating engagement of the dog clutch differential 104 may also include subsequently locking the first and second members 122, 126 in the engaged position 132. The process then proceeds to block 335.

In block 335, the controller 106 causes the output torque from the CVT 102 to return to the operator requested value.

Alternatively, the method 300 and teachings herein may be practiced to activate engagement of a dog clutch differential 104 disposed between the left and right rear axle output shafts 114*a*, 114*b* (first and second output shafts) or to activate engagement of a dog clutch differential 104 disposed between the left and right front axle output shafts 118*a*, 118*b* (first and second output shafts).

What is claimed is:

1. A system for providing smooth engagement of a dog clutch differential disposed on a vehicle, the system comprising:
    a power source configured to generate power for the vehicle;
    a dog clutch differential having first and second members and operably connected to and configured to distribute torque between a first output shaft and a second output shaft, the second member moveable between a disengaged position and an engaged position, wherein when the second member is in the engaged position, the first and second output shafts rotate together;
    a CVT operably coupled to the power source and to the dog clutch differential, the CVT configured to receive power from the power source and to provide output torque to the dog clutch differential, wherein the CVT is configured to receive a torque or speed or ratio command that is independent of engine speed; and
    a controller configured to, in response to an activation trigger, move the second member to the engaged position when the output torque from the CVT is about zero.

2. The system of claim 1, in which the controller is further configured to:
    determine the output torque from the CVT if the CVT output speed is not about zero; and
    if the output torque is determined to be greater than or less than about zero, reduce the output torque from the CVT to about zero.

3. The system of claim 1, in which the controller is further configured to:
    determine the output torque from the CVT if the CVT is in gear; and
    if the output torque from the CVT is determined to be greater than or less than about zero, reduce the output torque from the CVT to about zero.

4. The system of claim 1, in which the controller is further configured to:
    reduce the output torque from the CVT to about zero if the controller has received data indicating that wheel slip is occurring.

5. The system of claim 1, wherein the activation trigger is generated in response to operator input that requests engagement of the dog clutch differential.

6. The system of claim 1, in which the controller is further configured to increase the output torque from the CVT to an operator requested value after the second member is moved to the engaged position.

7. A method for providing smooth engagement of a dog clutch differential disposed on a vehicle, the vehicle including a power source configured to generate power for the vehicle, and a CVT operably coupled to the power source and to the dog clutch differential, the CVT configured to receive power from the power source and to provide output torque to the dog clutch differential, the dog clutch differential including a first member and a second member, the second member moveable between a disengaged position and an engaged position in which the first and second members rotate together, the method comprising:
    receiving, by a controller, an activation trigger; and
    in response to the activation trigger, moving the second member to the engaged position when the output torque from the CVT is about zero.

8. The method of claim 7 further comprising increasing the output torque from the CVT to an operator requested value after the second member is moved to the engaged position.

9. The method of claim 7, further comprising:
    determining, by the controller, the output torque from the CVT if the CVT output speed is not about zero; and
    if the output torque is determined to be greater than or less than about zero, reducing the output torque to about zero.

10. The method of claim 7 further comprising:
    determining, by the controller, the output torque from the CVT if the transmission is in gear; and
    if the output torque from the CVT is determined to be greater than or less than about zero, reducing the output torque to about zero.

11. The method of claim 7 further comprising:
    reducing, by the controller, the output torque to about zero if the controller has received data indicating that wheel slip is occurring.

12. The method of claim 7, in which the dog clutch differential is operably connected to a front output shaft and a rear output shaft, and is configured to distribute torque between the front output shaft and the rear output shaft, wherein when the second member is in the engaged position, the front and rear output shafts rotate together.

13. The method of claim 7, wherein the activation trigger is received from an operator input device in operable communication with the controller.

14. The method of claim 7, wherein the activation trigger is generated in response to data indicative of wheel slip occurring.

15. A system for providing smooth engagement of a dog clutch differential disposed on a vehicle, the system comprising:
    a power source configured to generate power;
    a dog clutch differential operably connected to and configured to distribute torque between a front output shaft and a rear output shaft, the dog clutch differential including a first member and a second member, the second member moveable between a disengaged position and an engaged position;
    a CVT operably coupled to the power source and to the dog clutch differential, the CVT configured to receive power from the power source and to provide output torque to the dog clutch differential;
    the front output shaft operably coupled to the dog clutch differential and to a front fraction member;

the rear output shaft operably coupled to the dog clutch differential and to a rear traction member; and a controller configured to, in response to an activation trigger, reduce CVT output torque to about zero and then move the second member to the engaged position, wherein when the second member is in the engaged position, the front and rear output shafts rotate together.

16. The system of claim 15, in which the controller is further configured to:

determine the output torque from the CVT if the vehicle is moving; and if the output torque is determined to be greater than or less than about zero, reduce the output torque to about zero.

17. The system of claim 15 in which the controller is further configured to:

determine the output torque from the CVT if the CVT is in gear; and if the output torque from the CVT is determined to be greater than or less than about zero, reduce the output torque to about zero.

18. The system of claim 15, in which the controller is further configured to:

reduce the output torque to about zero if the controller has received data indicating that wheel slip is occurring.

19. The system of claim 15, in which the controller is further configured to increase the CVT output torque to an operator requested value after the second member is moved to the engaged position.

20. The system of claim 15, in which the activation trigger is generated automatically in response to wheel slip measured by a sensor disposed adjacent to one of the front traction member and the rear traction member.

\* \* \* \* \*